Patented Feb. 10, 1953

2,628,196

UNITED STATES PATENT OFFICE 2,628,196

FLUORINE-CONTAINING LUBRICANT

Harry L. Coonradt, Woodbury, Barton W. Rope, Mullica Hill, and Alexander N. Sachanen, Woodbury, N. J., assignors to Socony-Vacuum Oil Company, Incorporated, a corporation of New York No Drawing. Original application August 10, 1950, Serial No. 178,747. Divided and this application June 27, 1951, Serial No. 233,948

5 Claims. (Cl. 252—46.7)

This invention has to do with new synthetic lubricants characterized by an especially desirable combination of properties, particularly high viscosity index and excellent chemical and thermal stability. More specifically, this invention relates to fluorine-containing hydrocarbons or fluorohydrocarbons so characterized.

This application is a division of our application Serial No. 178,747, filed August 10, 1950.

Considerable effort has been expended in the past to develop lubricants having a combination of desirable properties, with emphasis being directed to high viscosity index (V. I.) and stability under rigorous operating conditions. While the paraffinic-type lubricants, typified by Pennsylvania oils, have relatively high viscosity indices, they have not been able to satisfy the demands of present day operations in regard to chemical and thermal stability. Naphthenic- and aromatic-type lubricants, illustrated by Mid-Continent and Coastal oils, have undesirably low viscosity indices. Such disadvantageous characteristics of conventional oils have been countered or eliminated, in some instances, by incorporating with the oils one or more adjuvants, particularly V. I. improvers, oxidation inhibitors or stabilizers, and the like. In many cases, however, the improvement realized has been insufficient. This is illustrated by heavy duty motor oils, extreme pressure lubricants, hydraulic oils, etc. A further illustration is that of lubricating oils for high-pressure oxygen compressors. Conventional petroleum oils and synthetic organic lubricating oils burn rapidly on operation of such compressors and frequently form explosive mixtures with oxygen. There remains today, therefore, a demand for lubricants of excellent V. I. and stability.

Among the materials hitherto proposed as possible lubricants, in view of their exceptional chemical and thermal stability, are the fluorocarbons, $F_aC_b$, wherein $a$ and $b$ are integers. Unfortunately however, it has been found that fluorocarbons are uniformly characterized by low V. I. and high pour point values. For example, a perfluorinated octadecane has a calculated V. I. of —430. Fluorine-containing organic compounds have also been proposed as lubricants. Here again, success has been rather limited. By way of illustration, fluorine-containing compounds obtained by decomposing fluorine-containing polymers of tetrafluoroethylene and chlorotrifluoroethylene, have proven to be semi-solids or oily materials having poor viscosity indices and/or excessively high pour points. Other fluorine-containing compounds have been noted for their exceptional stability, and among such compounds are the polyfluorocyclobutanes described by Barrick in U. S. Letters Patent 2,441,128 and 2,462,345. The polyfluorocyclobutanes described therein, however, are not suitable for use as lubricants; some are solids, others are of low viscosity and suitable for use as solvents and reaction media.

Surprisingly, it has now been found that a certain well-defined group of polyfluorocyclobutanes are excellent lubricants, having desirably high V. I., chemical and thermal stability, and satisfactory pour characteristics. The polyfluorocyclobutanes contemplated herein are represented by the following general Formula I:

I. 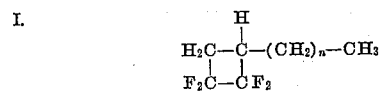

wherein $n$ is an integer from about 11 to about 19, and is preferably from about 13 to about 17.

Catalytic oxidation stability tests demonstrate the materials contemplated herein to be superior to uninhibited Pennsylvania type mineral oils. The characteristics of the new compositions are such as to make them outstanding synthetic lubricants, for use alone or blended with other lubricants.

The polyfluorocyclobutanes of this invention are prepared by reaction of tetrafluoroethylene with a straight chain, alpha hydrocarbon olefin having from about fourteen to about twenty-two carbon atoms per molecule. In accordance with the invention, the most desirable synthetic oils are those produced from straight chain, alpha mono-olefins having from about sixteen to about twenty carbon atoms per molecule. Typical olefins are: n-tetradecene-1; n-hexadecene-1; n-octadecene-1; n-eicosene-1; and n-docosene-1.

The state of purity of the straight-chain, alpha mono-olefin reactant from which the polyfluorocyclobutanes are derived, does not appear to be especially critical. It is desirable, however, to have a starting material which contains as large a percentage of the above-described alpha olefins as possible. It is permissible to have present lesser amounts of other olefins and of other hydrocarbon materials. In general, the olefinic charge preferably should contain less than about twenty per cent by weight of unsaturated hydrocarbons other than straight chain, alpha mono-olefins having from about fourteen to about twenty-two carbon atoms per molecule. However, since paraffins are not involved in the reaction with tetrafluoroethylene, the alpha-olefin-containing charge can contain as much as fifty per cent by weight of paraffinic hydrocarbons with the balance the specified normal, alpha mono-olefins. In many instances, in commercial operation, it will be found desirable to use technical grades of such olefins as n-tetradecene-1, n-hexadecene-1 and the like. Mixed olefinic materials derived from the thermal cracking of wax or from the Fischer-Tropsch process constitute satisfactory charging stock. In this connection, it should be noted that it is suspected that substantially straight chain 1-olefins having between about fourteen and about twenty-two carbon atoms per molecule, that is, 1-olefins in which the length of the side chain or chains is short relative to the length of the main carbon chain, are also suitable, although less preferred olefin reactants for the purpose of the present invention. However, in view of the fact that such olefins are unavailable, no test data can be adduced to confirm this suspicion.

The polyfluorocyclobutanes are prepared by heating, under autogenous pressure, the monoolefin and tetrafluoroethylene reactants. Temperature of reaction can be varied over a wide range, as from about 200° F. to about 800° F. It will be understood, of course, that excessively high temperatures at which the reactants and/or products decompose, are to be avoided. In general, temperatures within the range of 400° F. to 600° F. are preferred. As indicated, the pressure at which reaction is conducted depends upon the nature of the reactants, equipment and other reaction conditions such as temperature. Generally, high pressures favor the reaction. Satisfactory operations have been attended by autogenous pressures from about 400 to 600 pounds per square inch. Reaction is generally carried out in a closed system. However, the reactants can be passed continuously through a hot reaction tube.

Reaction of the aforesaid olefins and tetrafluoroethylene is quite rapid as indicated by a decrease in pressure when the reactants are brought together at a suitable temperature. Thus, the reaction time can be as low as several minutes, or can be extended, depending upon the nature of the reactants, temperature, etc. Reaction periods between about one-half hour and about two hours have proven advantageous.

The proportions of the alpha mono-olefin and of the tetrafluoroethylene reactants are also susceptible of variation, although the principal reaction involves the combination of equimolar quantities of the two reactants. One competing reaction is the polymerization of the monoolefin hydrocarbon reactant. Under the conditions of the reaction, and as shown by Seger and Sachanen in Patent No. 2,500,166, thermal polymerization of normal, alpha monoolefins is of little consequence at temperatures below 500° F. unless such temperatures are maintained for an extremely long period of time, e. g., forty hours. Moreover, reaction of tetrafluoroethylene with the olefin is much more rapid than olefin polymerization. In the instant reaction, therefore, polymerization of the normal, alpha monoolefin reactant is not a serious factor. Another side reaction is the dimerization of tetrafluoroethylene. Inasmuch as this competing reaction consumes the reactant which is generally more expensive, it is usually advantageous to use an excess of normal, monoolefin reactant.

In regard to selecting a proper proportion of reactants and operating technique, to obtain the polyfluorocyclobutanes of this invention, it has also been found that particularly efficient operation is attained by regulating the rate of addition of tetrafluoroethylene to the normal, monoolefin reactant. This technique is described in detail in our application Serial No. 178,748, filed August 10, 1950.

It is within the scope of this invention to perform the reaction either by a batch process or a continuous process, and to recycle unconverted reactants for further reaction.

Catalysts and/or inhibitors are not required in effecting reaction of the foregoing reactants. As shown in the typical examples hereinbelow, unstabilized and uninhibited reactants have been reacted successfully to provide the desired products. It will be understood, of course, that a polymerization inhibitor can be incorporated into the reaction mixture, if desired, particularly to inhibit polymerization of tetrafluoroethylene, although our investigations indicate that an inhibitor is not essential.

In order to illustrate the principles of this invention several typical, and non-limiting, preparations are described in the following examples. These preparations were carried out in a rocking-type bomb (American Instrument Co.). The reactants were charged to the bomb, which was then heated to the desired temperature for the desired time interval. Thereafter, the bomb was cooled, and discharged. The contents of the bomb were vacuum distilled to separate the reaction product into several fractions, namely, unreacted materials, desired product and by-products. It should be noted that the reaction times, given in the examples, represent the time intervals during which the bomb was maintained at the desired temperature, and do not include the time intervals necessary to heat the bomb and its contents to the desired temperature, and do not include the time intervals necessary to cool the bomb after heat to the bomb has been discontinued.

EXAMPLE I

Equimolar proportions of n-octadecene-1, eighty-five parts by weight, and of tetrafluoroethylene, thirty-three parts by weight, were charged to a bomb, and heated at 530–540° F. under autogenous pressure (maximum, 400 pounds per square inch) for eight hours. One hundred and two parts (weight) of liquid product were obtained. The liquid product was distilled to a maximum temperature of 272° F. at 1 mm. of mercury. In addition to recovered n-octadecene-1, 29.3 parts (weight) of addition product were obtained. The addition product boils at 127.5–133.5° C. (261.5–272.3° F.) at 1 mm. of mercury, and has a refractive index $(n_D^{25})$ of 1.4212. Analysis revealed a carbon content of 67.4 per cent and a fluorine content of 22.1, which compares well with 68.1 per cent carbon and 21.6 per cent fluorine, respectively, for $C_{20}H_{36}F_4$. The product can be represented as

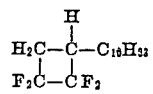

Infrared spectrographic analysis of the product disclosed no absorption in the region 5.3–5.9 microns, which is characteristic of fluorocarbon olefins.

EXAMPLE II

A bomb of the aforesaid character was charged with 1.5 molar proportions (378 parts by weight) of n-octadecene-1 and 1.52 molar proportions (152 parts by weight) of tetrafluoroethylene. The mixture was heated at 545–560° F. for two hours and forty minutes under autogenous pressure (maximum 560 pounds per square inch). Liquid product recovered from the bomb comprise 426.6 parts (weight). The liquid product was distilled to a maximum temperature of 161° C. at 1 mm. of Hg. Addition product recovered comprised 158.3 parts (weight); this has a boiling point of 150–160° C. at 1 mm. of Hg. This product is predominantly $C_{20}H_{36}F_4$.

There also was obtained 103.3 parts (weight) of product having a boiling point above 161° C. at 1 mm. of Hg. This product contains 7.3 per cent of fluorine. The nature of this product has not yet been definitely established. It most probably is a complex mixture containing an addition product of tetrafluoroethylene and an unsaturated thermal polymer of n-octadecene-1.

The physical properties of the product $C_{20}H_{36}F_4$ are listed below:

| | |
|---|---|
| Kinematic viscosity, cs. @ 100° F | 7.50 |
| Kinematic viscosity, cs. @ 210° F | 2.21 |
| Viscosity index (V. I.) | 111 |
| Specific gravity, 60° F./60° F | 0.965 |
| Gravity, °A. P. I. | 15.2 |
| Pour point, °F | 45 |
| Boiling point, °F. @ 1 mm. Hg | 262–272 |
| Refractive index, $n_D^{25}$ | 1.4212 |
| Fluorine, wt. percent | 22.1 |

The physical properties, particularly viscosity, of the polyfluorocyclobutane, indicate that it falls close to the proposed classification of S. A. E. 5 lubricants. The polyfluorocyclobutane, therefore, is suitable for use in engine lubrication, transformer oils, etc.

EXAMPLE III

A stainless steel bomb with a void of approximately one liter was charged with 295.8 grams (1.5 mol) of n-tetradecene-1 and 155 grams (1.55 mol) of tetrafluoroethylene. The mixture was heated at about 550° F. under autogenous pressure (maximum, 400 pounds per square inch) with shaking for three hours. The bomb was cooled and gaseous material vented. Liquid product recovered comprised 377 grams. When the latter was distilled to a maximum temperature of 253° F. at 4 mm. of Hg, there was obtained 162.5 grams of addition product. Properties of the addition product include:

| | |
|---|---|
| Kinematic viscosity @ 100° F | 4.21 |
| Kinematic viscosity @ 210° F | 1.46 |
| V. I. (calculated) | 111 |
| Boiling point, °F. @ 4 mms. Hg | 236–253 |
| Boiling point, °F. @ 760 mms. Hg. (calc.) | 523–532 |
| Refractive index, $n_D^{20}$ | 1.4120 |
| Fluorine, wt. percent | 25.5 |

Fluorine content (25.5%) of the product compares well with the fluorine content, 25.6% of $C_{16}H_{28}F_4$. The product can be represented as:

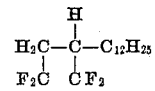

Viscosity characteristics of this product come below the S. A. E. 5 classification. The product is suitable for use as a transformer oil and for special lubrication where a light oil is required.

EXAMPLE IV

That the lubricants of this invention have excellent stability is shown by results of a catalytic oxidation test, which reveals the stability of oils toward catalytic oxidation. The test results are shown below in Table I.

The test oil, 20 or 25 ccs., is placed in a 200 × 25 mms. test tube with 15.6 square inches of sandblasted iron wire, 0.78 square inch of polished copper wire, 0.87 square inch of polished aluminum wire, and 0.167 square inch of polished lead plate. Dry air is passed through the sample of oil at a rate of 10 liters per hour. The test tube is heated at 260° F. for 40 hours in an aluminum block bath. The results reported at the end of the test are: neutralization number (N. N.); per cent viscosity increase at 210° F.; sludge and lacquer; lead weight loss (in milligrams); and appearance of copper. The oil is compared with a reference oil of similar viscosity and is rated on the basis of viscosity increase, N. N. increase, sludge and lead weight loss. A maximum of three demerits is assigned to each factor rated. The sum of the demerits for an oil is called the stability number and ranges from 0 to 12. The reference mineral oils, solvent-refined Pennsylvania oils, have stability numbers of 6 to 7.

Also shown in Table I is a test with the polyfluorocyclobutane obtained from n-octadecene-1 (Example II) having incorporated therewith a small amount of an outstanding inhibitor comprising an oil-soluble, phosphorus- and sulfur-containing reaction product of pinene and phosphorus pentasulfide, which is described in detail in Patent No. 2,416,281. The inhibitor or additive, A, that was used contained about 50 per cent of said reaction product and about 50% of mineral oil.

It will be noted that the tests on the synthetic lubricant were made on 20 mml. samples in contrast to the 25 mml. sample of reference oil. Since the air rate and amount of catalytic metals present were maintained at the regular test level, the tests on the synthetic oil were actually more severe than normal and, therefore, the stability of the synthetic oil is rated conservatively.

*Table I*

OXIDATION STABILITY OF OILS

| | Commercial S. A. E. 10 Oil, V. I. 110 | Addition Product of Tetrafluoroethylene and 1-Octadecene (Ex. I) | Addition Product (Ex. II) plus 1% Additive A |
|---|---|---|---|
| Sample, ml | 25 | 20 | 20. |
| Initial K. V., cs. @ 210° F | 5.69 | 2.21 | 2.21. |
| Final K. V., cs. @ 210° F | 10.64 | 2.37 | 2.34. |
| Viscosity Increase, percent | 87.5 | 7.2 | 5.8. |
| S/V Neut. No. (final) | 13.3 | 1.5 | 1.5. |
| Sludge | Nil | Nil | Nil. |
| Lead Loss, mg | 200.5 | 136.4 | 88.0. |
| Copper, appearance | Brassy | Dull | Black. |
| Stability Number | 6 | 2 | 1. |

It is apparent from the results shown in Table I that the polyfluorocyclobutane lubricant is substantially more stable in all respects than the reference oil. Particularly, the increases in viscosity in N. N. values are much less than the corresponding values of the reference oil. In addition, the synthetic lubricant responds well to the inhibitor, particularly as evidenced by the further improvement in reducing the lead loss.

EXAMPLE V

The polyfluorocyclobutane derived from tetrafluoroethylene and n-octadecene-1, products from Examples I and II combined, is also excellent as an extreme pressure lubricant. This is demonstrated by results obtained in the Falex Wear Test. This test is described in the minutes of the S. A. E. Society, September 29–October 1, 1937, in a publication of Crowley and Faville. The test involves rotation of a small steel pin between two steel V blocks in a bath of the lubricant, under increasing pressure upon the pin. The most significant result of the test is the pressure at seizure. The pressure, in pounds per square inch, refers to the hydraulic pressure of the pump loading specimens. Temperature is also reported for it gives some indication of the effectiveness of the lubricant, since all tests start at 100° F. and the rise in temperature is related to friction.

Shown also in Table II for comparative purposes is a typical mineral oil, and a typical fortified lubricant comprising mineral oil and oil addition agents.

*Table II*

| Lubricant | Seizure, p. s. i. | Temp., ° F. |
| --- | --- | --- |
| S. A. E. 60—straight mineral oil | 240 | 121 |
| S. A. E. 10+1% A [1] | 240 | 206 |
| Addition Product, Example V | 450 | 128 |

[1] Additive A described in Example IV.

The test results in Table II reveal that the polyfluorocyclobutane derived from n-octadecene-1 is superior to conventional lubricants in withstanding extreme pressures.

As will be evident from the data presented above in Tables I and II, the condensation products of this invention are highly desirable lubricants per se. They are also of considerable value as blending agents for other lubricating oils. In view of the inherent stability of the synthetic oils, they impart stability to the oils with which they are blended. So also, they impart desirable viscosity index (V. I.) to the oils in combination therewith, for as indicated above, they have advantageous viscosity index properties. In short, the synthetic oils find utility in "upgrading" other lubricants. Typical oils with which the synthetic oils may be blended are mineral oils such as are normally used in internal combustion and turbine engines. When so blended, the synthetic oils may comprise the major proportion of the final blended oil, or may even comprise a minor proportion thereof. For example, although used only in the amounts of the order of 1–10 per cent, the synthetic oils improve the stability of mineral oils, such as S. A. E. 10 and 20 Pennsylvania type oils. Thus, the lubricants of this invention are in sharp contrast with perfluorinated hydrocarbons which are immiscible with mineral oils.

One or more of the individual properties of the synthetic lubricants of this invention may be further improved by incorporating therewith a small, but effective amount, of an addition agent such as an antioxidant, a detergent, an extreme pressure agent, a foam suppressor, a viscosity index (V. I.) improver, etc. Antioxidants are well-known in the art, and are generally characterized by phosphorus, sulfur, nitrogen, etc. content; representative of such materials is an oil-soluble, phosphorus- and sulfur-containing reaction product of pinene and phosphorus pentasulfide. Typical detergents which may be so used are metal salts of alkyl-substituted aromatic sulfonic or carboxylic acids, as illustrated by diwax benzene barium sulfonate and barium phenate, barium salt of a wax-substituted phenol carboxylic acid. Extreme pressure agents are well known; illustrating such materials are numerous chlorine and/or sulfur containing compositions, one such material being a chlornaphtha xanthate. Silicones, such as dimethyl silicone, may be used to illustrate foam suppressing compositions. Viscosity index improving agents which may be used are typified by polypropylenes, polyisobutylenes, polyacrylate esters, and the like.

Contemplated also as within the scope of this invention is a method of lubricating relatively moving surfaces by maintaining therebetween a film consisting of any of the aforesaid oils.

It is to be understood that the foregoing description and representative examples are non-limiting and serve to illustrate the invention, which is to be broadly construed in the light of the language of the appended claims.

A related group of synthetic lubricants of excellent quality is described by one of the applicants, A. N. Sachanen, in related application Serial No. 178,749, filed August 10, 1950 which has matured into Patent No. 2,582,283, issued January 15, 1952. The lubricants of the latter application are polyfluorodicyclobutanes represented by general Formula II.

II. 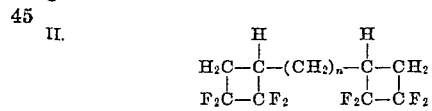

wherein $n$ is an integer from about ten to about eighteen, and is preferably from about twelve to about sixteen.

We claim:

1. A composition of matter comprising in combination a mineral oil and

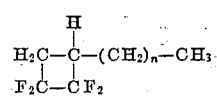

wherein $n$ is an integer from about eleven to about nineteen.

2. A composition of matter comprising in combination a mineral oil and

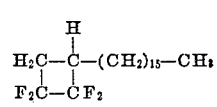

3. A composition of matter comprising in combination a mineral oil and

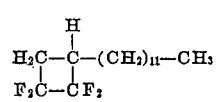

4. A composition of matter comprising in combination a mineral oil and

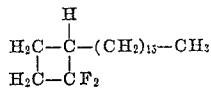

and a minor proportion of an oil-soluble, phosphorous- and sulfur-containing reaction product obtained by reacting approximately four molar proportions of pinene with one molar proportion of phosphorus pentasulfide at a temperature between about 100° C. and about 160° C.

5. A composition of matter comprising in combination a mineral oil and

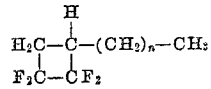

wherein $n$ is an integer from about eleven to about nineteen, and a minor proportion of an oil-soluble, phosphorus- and sulfur-containing reaction product obtained by reacting approximately four molar proportions of pinene with one molar proportion of phosphorus pentasulfide at a temperature between about 100° C. and about 160° C.

HARRY L. COONRADT.
BARTON W. ROPE.
ALEXANDER N. SACHANEN.

REFERENCES CITED

The following references are of record in the file of this patent:

UNITED STATES PATENTS

| Number | Name | Date |
|---|---|---|
| 2,462,345 | Barrick | Feb. 22, 1949 |
| 2,551,639 | Feasley | May 8, 1951 |
| 2,562,547 | Hanford | July 31, 1951 |

UNITED STATES PATENT OFFICE
Certificate of Correction

Patent No. 2,628,196                      February 10, 1953

Harry L. Coonradt et al.

It is hereby certified that error appears in the printed specification of the above numbered patent requiring correction and that the said Letters Patent should read as corrected below.

Column 9, lines 3 to 6, inclusive, the formula should appear as shown below instead of as in the patent:

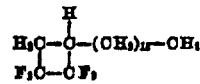

Signed and sealed this 10th day of June 1953.

[SEAL]

Attest:
KARL H. AXLINE,
Attesting Officer.

ROBERT C. WATSON,
Commissioner of Patents.